(12) United States Patent
Jung

(10) Patent No.: US 8,502,916 B2
(45) Date of Patent: Aug. 6, 2013

(54) VIDEO SIGNAL PROCESSING METHOD AND APPARATUS

(75) Inventor: Jung Hun Jung, Goonpo-si (KR)

(73) Assignee: HUMAX Co., Ltd., Seongnam-si (KR)

( * ) Notice: Subject to any disclaimer, the term of this patent is extended or adjusted under 35 U.S.C. 154(b) by 1455 days.

(21) Appl. No.: 12/094,681

(22) PCT Filed: Nov. 21, 2006

(86) PCT No.: PCT/KR2006/004893
§ 371 (c)(1),
(2), (4) Date: May 22, 2008

(87) PCT Pub. No.: WO2007/061208
PCT Pub. Date: May 31, 2007

(65) Prior Publication Data
US 2008/0309831 A1    Dec. 18, 2008

(30) Foreign Application Priority Data

Nov. 24, 2005    (KR) .................. 10-2005-0113039

(51) Int. Cl.
*H04N 7/01*    (2006.01)

(52) U.S. Cl.
USPC .................. 348/441; 348/458; 348/459

(58) Field of Classification Search
USPC ......................... 348/458, 459, 441
See application file for complete search history.

(56) References Cited

U.S. PATENT DOCUMENTS

| | | | |
|---|---|---|---|
| 5,696,848 A * | 12/1997 | Patti et al. ................ | 382/254 |
| 7,565,003 B2 * | 7/2009 | Ashizaki et al. ........... | 382/154 |
| 2005/0225571 A1 * | 10/2005 | Collins et al. ............ | 345/660 |
| 2009/0080805 A1 * | 3/2009 | Tanaka et al. ............. | 382/299 |

FOREIGN PATENT DOCUMENTS

EP    0 998 122 A2    5/2000

OTHER PUBLICATIONS

Kwon, Goo-Rak, "An Efficient POCS-based Post-processing Technique Using Wavelet Transform in HDTV", Sep. 28, 2005, IEEE, p. 2.*
Tian, Bin et al.; "A Wavelet Constrained POCS Supperresolution Algorithm for High Resolution Image Reconstruction From Video Sequence"; Neural Networks and Signal Processing, 2003 Proceedings of the 2003 International Conference on vol. 2 Dec. 14-17 2003; pp. 1266-1269.
Kwon, Goo-Rak et al.; An Efficient POCS-based Post-processing Technique Using Wavelet Transform in HDTV; Consumer Electronics, IEEE Transactions on vol. 51, Issue 4; Nov. 2005; pp. 1283-1290.
PCT International Search Report dated Feb. 12, 2007.

* cited by examiner

*Primary Examiner* — Nasser Goodarzi
*Assistant Examiner* — Hyun Hong
(74) *Attorney, Agent, or Firm* — KED & Associates, LLP

(57) ABSTRACT

Disclosed herein is a video signal processing method and apparatus. In an embodiment of the present invention, video having a second screen size is generated from input video having a first screen size through Wavelet/Bicubic video interpolation, and a parallel Projection Onto Convex Sets (POCS) method is applied to the generated video having the second screen size. In this embodiment, the video having the second screen size, which is generated through Wavelet/Bicubic video interpolation, is used as an initial value for the POCS method, and a motion component estimated based on the video having the first screen size and the video having the second screen size obtained through the use of the POCS method is used as a correction value for the POCS method. Accordingly, HD-class video can be rapidly produced from SD-class video without image degradation.

Figure 1:
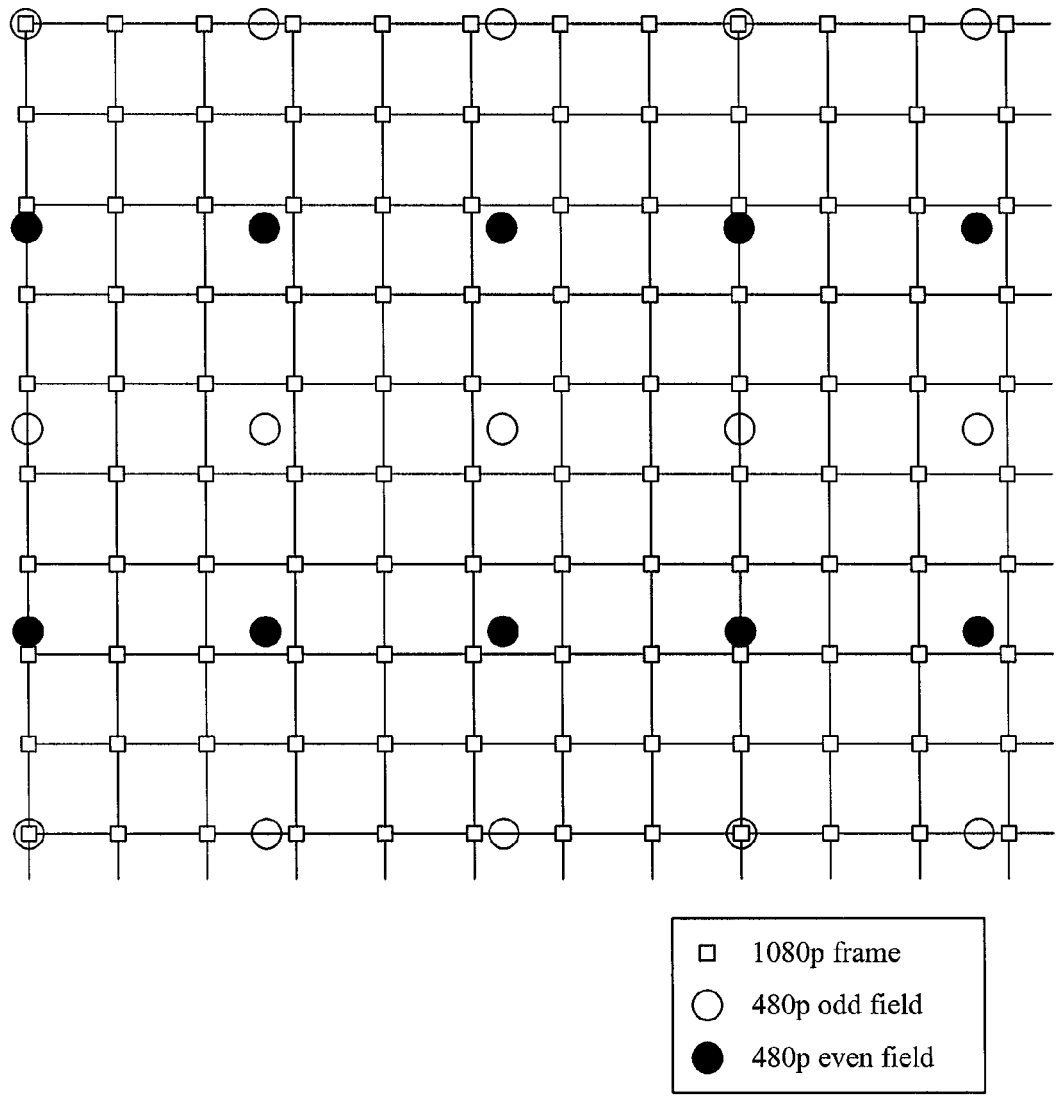

10 Claims, 2 Drawing Sheets ical Field

The present invention relates generally to a video signal processing method and apparatus and, more particularly, to a method and apparatus for converting Standard Definition (SD) video signals into High Definition (HD) video signals.

2. BACKGROUND ART

Recently, as large-sized screen televisions have become popularized, there is a need for an apparatus for converting SD video into HD video. Furthermore, as digital televisions (D-TVs) have become widely popularized, various types of signal processing are digitized.

Such D-TVs have large-sized screens, and use simple interpolation methods, such as nearest neighborhood, linear and bicubic methods, in order to output SD video to large-sized screens while supporting HD-TV signals. The D-TVs also use simple methods such as a method of increasing a sample frequency and then performing anti-imaging filtering.

However, in the above methods, it is difficult to represent detailed portions of a screen, it is impossible to avoid degradation such as aliasing or blurring, and it is also difficult to eliminate noise contained in input signals.

Furthermore, in order to solve the above problems, a video recovery theory-based super-resolution video expansion method has been proposed. However, this method is problematic in that it cannot be implemented in real time and the performance thereof is poor.

3. DISCLOSURE OF INVENTION

Accordingly, the present invention has been made keeping in mind the above problems occurring in the prior art, and an object of the present invention is to provide a method of producing HD video at high speed without degrading SD video.

In order to accomplish the above object, a video signal processing method according to an embodiment of the present invention includes the steps of generating video having a second screen size from an input video having a first screen size through wavelet/bicubic interpolation; and applying a parallel Projection Onto Convex Sets (POCS) method to the generated video having the second screen size; wherein the video having the second screen size, generated through the wavelet/bicubic video interpolation, is used as an initial value for the POCS method, and a motion component, estimated based on the video having the first screen size and an expanded video having the second screen size obtained through the application of the POCS method, is used as a correction value for the POCS method.

In an embodiment, input interlaced scanning video is converted into progressive scanning video. Furthermore, the video that is output after the application of the POCS method may undergo a deblurring process. In this case, a Gaussian smoothing filter may be used.

In an embodiment, the parallel POCS method is expressed by $$x^{k+1} = P_n P_{n-1}\left(\frac{1}{n-2}\sum_{i=1}^{n-2} P_i\right) x^k,$$

where x is video data, $P_n$, $P_{n-1}$, and $P_i$ (i=1, ..., n-2) are three types of different projection operations, and $P_i$ (i=1, ..., n-2) is processed in parallel. In this case, the projection operators $P_n$ and $P_{n-1}$ may be related to constraints for a size and a band of output data, respectively, and the set $P_i$ (i=1, ... n-2) may be related to conversion between the first screen size and the second screen size.

A video signal processing apparatus according to another embodiment of the present invention includes a video interpolation unit for generating video having a second screen size from an input video having a first screen size through wavelet/bicubic interpolation; a video expansion unit for expanding video through application of a parallel POCS method using the video having the second screen size, generated through the video interpolation unit, as an initial value and an estimated motion component as a correction value; memory for storing the expanded video having the second screen size obtained through the video expansion unit; and a motion estimation unit for estimating a motion component of a video based on the video having the first screen size and the video having the second screen size stored in the memory, and providing the estimated motion component to the video expansion unit.

In a machine-readable storage medium containing instructions according to still another embodiment of the present invention, the instructions are executed in a video signal processing apparatus and cause the apparatus to generate video having a second screen size from an input video having a first screen size through wavelet/bicubic interpolation; and apply a parallel Projection Onto Convex Sets (POCS) method to the generated video having a second screen size; wherein the video having the second screen size, generated through the wavelet/bicubic video interpolation, is used as an initial value for the POCS method, and a motion component, estimated based on the video having the first screen size and an expanded video having the second screen size obtained through the application of the POCS method, is used as a correction value for the POCS method.

4. BRIEF DESCRIPTION OF DRAWINGS

Figure 2:
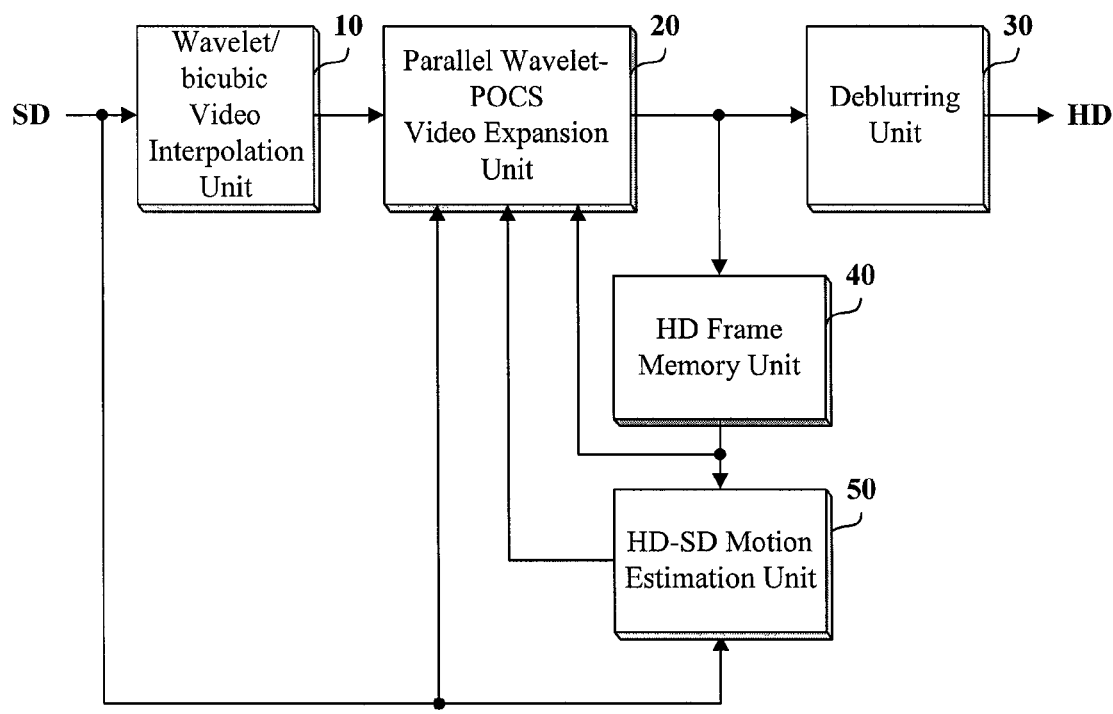

FIG. 1 is a view illustrating the positional relationship between an 480p image and a 1080p image; and FIG. 2 is a block diagram showing the construction of a video signal scaling apparatus according to an embodiment of the present invention.

5. MODES FOR CARRYING OUT THE INVENTION

A preferred embodiment of a video signal processing method and apparatus according to the present invention is described in detail below with reference to the accompanying drawings.

In the present invention, a Projection Onto Convex Sets (POCS)-based super-resolution video expansion method is basically used. POCS is one of the optimal methods for video recovery, and is advantageous in that it can be easily implemented and can be conveniently applied to a complex degradation model. The basic equation of POCS is as follows:

$$x^{k+1} = P_n P_{n-1} \ldots P_2 P_1 x^k \quad\quad 1)$$

where $P_i$ is a projection operator for confining the solution of x within a closed convex set $C_i$. The convex set is information about video, that is, concrete constraints to video.

According to Equation 1), the solutions of x exist within $C_s = I_{i=1}^{n} C_i$, that is, an intersection of all convex sets. When much more accurate convex sets are used, more accurate solutions can be obtained because the range of the intersection is narrowed.

Equation 1) is disadvantageous in that speed is low at the time of hardware implementation because the components are connected in series to each other, and thus the projection operations must be performed sequentially. Therefore, to achieve actual implementation, it is necessary to change the construction of Equation 1) so that the components thereof can be connected in parallel to each other as much as possible. In this case, it should be noted that only projection operations of the same kind should be connected in parallel to each other. An example thereof is as follows:

$$x^{k+1} = P_n P_{n-1} \left( \frac{1}{n-1} \sum_{i=1}^{n-2} P_i \right) x^k \quad\quad 2)$$

where $P_n$, $P_{n-1}$ and $P_i$ (i=1, . . . , n−2) are three respective kinds of projection operations. In Equation 1), waiting must be conducted until a total of n operations are completed for every $k^{th}$ step, whereas in Equation 2), merely the time taken to perform three operations suffices because a third projection operation set is processed in parallel.

The types of projection operations proposed in the present invention are four in number, for example, $P_{luma}$, $P_{smooth}$, $P_{SDi}$ and $P_{HDi}$. The last two types of operations have the same feature, therefore they may be integrated into a single type of operation.

Furthermore, $P_{luma}$ is a projection operator having the following constraint that limits the range of luminance components of video within a range from 16 to 235 when x is video:

$$C_{luma} = \{x: 16 \leq x \leq 235\} \quad\quad 3)$$

This is one of the fundamental convex sets applicable to video processing, and can also be applied to color difference video in the same manner, with the range of values being adjusted. The role of the constraint in a video expansion system is to prevent the brightness value of video from exceeding a specific value in case of using an interpolation filter and a smoothing filter.

$P_{smooth}$ is a projection operator indicating that the band of a video signal is generally limited to a certain extent, and can be expressed by the following convex set:

$$C_{smooth} = \{x[n_1,n_2]: |\Sigma S[m_1,m_2]x[n_1,n_2;m_1,m_2]| \leq \delta_{smooth}\} \quad\quad 4)$$

where $\delta_{smooth}$ is the range of the convex set $C_{smooth}$, and S is a high frequency filter, and can use the following Laplacian operator:

$$S = \frac{1}{8} \begin{bmatrix} 0 & -1 & 0 \\ -1 & 4 & -1 \\ 0 & -1 & 0 \end{bmatrix} \quad\quad 5)$$

In Equation 4), assuming that $r_s[n_1,n_2] = \Sigma S[m_1,m_2]x[n_1,n_2;m_1,m_2]$, the projection operation equation can be expressed as follows:

$$P_{smooth} x = x[n_1, n_2] - \begin{cases} (r_s[n_1, n_2] - \delta_{smooth}), & r_s[n_1, n_2] > \delta_{smooth} \\ 0, & |r_s[n_1, n_2]| < \delta_{smooth} \\ (r_s[n_1, n_2] + \delta_{smooth}), & r_s[n_1, n_2] < -\delta_{smooth} \end{cases} \quad\quad 6)$$

Furthermore, S in Equation 5) can be divided according to directionality. For example, in the present invention, the following operators are used with the direction of an edge for each pixel divided into monotone, horizontal, vertical, 35-degree and 135-degree directions, and a Sobel filter may be used for the detection of an edge and the division of direction:

$$S_{monotone} = \frac{1}{8} \begin{bmatrix} 0 & -1 & 0 \\ -1 & 4 & -1 \\ 0 & -1 & 0 \end{bmatrix}, \quad\quad 7)$$

$$S_{horizontal} = \frac{1}{4} \begin{bmatrix} 0 & 0 & 0 \\ -1 & 2 & -1 \\ 0 & 0 & 0 \end{bmatrix},$$

$$S_{vertical} = \frac{1}{4} \begin{bmatrix} 0 & -1 & 0 \\ 0 & 2 & 0 \\ 0 & -1 & 0 \end{bmatrix},$$

$$S_{45°} = \frac{1}{4} \begin{bmatrix} 0 & 0 & -1 \\ 0 & 2 & 0 \\ -1 & 0 & 0 \end{bmatrix},$$

$$S_{135°} = \frac{1}{4} \begin{bmatrix} -1 & 0 & 0 \\ 0 & 2 & 0 \\ 0 & 0 & -1 \end{bmatrix}$$

If the band constraint is performed while considering the direction of the edge as described above, detailed portions of video can be represented as it is. For example, when the tangential direction of an edge is vertical, a band is limited only in a vertical direction, but is not limited in a horizontal direction. Thus, this method can decrease noise and distortion without changing the sharpness of the edge. This method can also significantly remove a ringing phenomenon that occurs near the edge.

Meanwhile, $P_{SDi}$ and $P_{HDi}$ are constraints that can be found from the viewpoint of video expansion. First, it is necessary to define the following Equation:

$$y = Hx \quad\quad 8)$$

where x is an HD image having high resolution, y is an SD image having standard resolution, and H is an operation of down-sampling an HD image into an SD image.

It is assumed that y is a signal that has undergone de-interlacing. The reason for this is that de-interlacing is very different from a typical video expansion method, even though de-interlacing is one of video expansion processes.

Assuming that a current SD image is $y_1$ and a previous image preceding the current SD image by (n−1) images is $y_n$, a current HD image x must be determined with respect to $y_n$ so that the absolute value of the following Equation is minimized:

$$r_{SD} = y_n - HM_r x \qquad 9)$$

where $M_n$ is a displacement from a previous (n−1)th image to a current image. Equation 9) is expressed only for a current SD image as follows:

$$r_{SD} = y_1 - Hx \qquad 10)$$

A projection operation equation for Equation 10) is expressed as follows:

$$P_{SD1} x = x[n_1, n_2] + \qquad 11)$$

$$w[n_1, n_2] \times \begin{cases} H^T(r_{SD}[m_1, m_2] - \delta_{SD1}), & r_{SD}[m_1, m_2] > \delta_{SD1} \\ 0, & |r_{SD}[m_1, m_2]| \le \delta_{SD1} \\ H^T(r_{SD}[m_1, m_2] + \delta_{SD1}), & r_{SD}[m_1, m_2] < -\delta_{SD1} \end{cases}$$

where $H^T$ is an up-sampling operation from an SD image to an HD image, and w is a weight matrix having a correlation with an pixel of the image $y_1$ at each pixel location of the image x.

For example, as illustrated in FIG. 1, assuming that y is 480p, x is 1080p, and y[0,0] and x[0,0] exist at the same location, a positional relationship is obtained as illustrated in FIG. 1. The locations of the 1080p pixels coincide with those of the 480p pixels for every 8 pixels in a horizontal direction and for every 9 pixels in a vertical direction on the basis of the pixel locations 1080p. As a result, the following 8×9 weight matrix can be established:

$$w_1 = \begin{bmatrix} 1 \\ 0.7 \\ 0.9 \\ 0.8 \\ 0.9 \\ 0.9 \\ 0.8 \\ 0.9 \\ 0.7 \end{bmatrix} [1 \ 0.7 \ 0.8 \ 0.9 \ 0.6 \ 0.9 \ 0.8 \ 0.7] \qquad 12)$$

Meanwhile, the 480p image is a result of de-interlacing the 480i image. An interlaced field has a low probability of having an original signal compared to a unique field for reasons such as the possibility of motion being detected, error included in a motion vector, etc. Consequently, the following weight matrix can be established depending on whether the 480i image existing prior to de-interlacing is an odd field or an even field:

$$w_{odd} = \begin{bmatrix} 1 \\ 0.9 \\ 0.8 \\ 0.9 \\ 0.95 \\ 0.95 \\ 0.9 \\ 0.8 \\ 0.9 \end{bmatrix} [1 \ 1 \ 1 \ 1 \ 1 \ 1 \ 1 \ 1] \qquad 13)$$

$$w_{even} = \begin{bmatrix} 0.8 \\ 0.9 \\ 0.95 \\ 0.9 \\ 0.8 \\ 0.8 \\ 0.9 \\ 0.95 \\ 0.9 \end{bmatrix} [1 \ 1 \ 1 \ 1 \ 1 \ 1 \ 1 \ 1] \qquad 14)$$

The following weight matrix w can be finally obtained using Equation 12) and Equation 13) or 14) as follows:

$$w[n'_1, n'_2] = \begin{cases} w_1 \cdot w_{odd}, & \text{for odd field} \\ w_1 \cdot w_{even}, & \text{for even field} \end{cases} \qquad 15)$$

where the operation '·' is not a matrix multiplication, but a scalar multiplication with an item at the same location, wherein $n'_1 = (8-n_1) \bmod 8$ and $n'_2 = (9-n_2) \bmod 9$. The following projection operation Equation can be obtained by applying Equation 9) to the (n−1)th previous SD image:

$$P_{SDn} x = x[n_1, n_2] + \alpha \times \qquad 16)$$

$$\begin{cases} M_n^T H^T(m_r[m_1, m_2])(r_{SD}[m_1, m_2] - \delta_{SDn})), & r_{SD}[m_1, m_2] > \delta_{SDn} \\ 0, & |r_{SD}[m_1, m_2]| \le \delta_{SDn} \\ M_n^T H^T(m_r[m_1, m_2])(r_{SD}[m_1, m_2] + \delta_{SDn})), & r_{SD}[m_1, m_2] < -\delta_{SDn} \end{cases}$$

where α is a constant indicating a correlation between a current image and a previous image, and can be set to 1/n because the correlation is in inverse proportion to the time difference. $m_r[m_1, m_2]$ is a weight matrix indicating the accuracy of motion estimation that has been performed between the current image and the (n−1)th image. The result, obtained by performing motion compensation on the current HD image with respect to the (n−1)th HD image and then applying down-sampling to the result of the motion compensation, can be expressed using a value indicating the difference with respect to the (n−1) th SD image (Equation 9)) as follows:

$$m_r[m_1, m_2] = \begin{cases} 0, & |r[m_1, m_2]| \ge \max_{mr} \\ \dfrac{(\max_{mr} - |r[m_1, m_2]|)}{\max_{mr}} & |r[m_1, m_2]| < \max_{mr} \end{cases} \qquad 17)$$

where $\max_{mr}$ is the limit of allowable motion compensation error. By using this, the occurrence of degradation of an expanded image due to an erroneous motion estimation value can be prevented.

Meanwhile, the current image to be expanded also has a correlation with the previous HD image, which has already been expanded, separately from the previous SD image. A constraint that can minimize the absolute value of the following Equation may be obtained in order to use the correlation in video expansion:

$$r_{HD} = M_{HDn}^T x_n - x \qquad 18)$$

where $x_n$ is an (n−1, n≧2)th previous HD image, and x is considered to be $x_1$. The following projection operation Equation can be obtained using Equation 18):

$$P_{HDn}x = x[n_1, n_2] + \alpha \times \begin{cases} (H^T m_{rHD}[m_1, m_2]) \cdot (r_{HD}[n_1, n_2] - \delta_{HDn}), & r_{HD}[n_1, n_2] > \delta_{HDn} \\ 0, & |r_{HD}[n_1, n_2]| < \delta_{HDn} \\ (H^T m_{rHD}[m_1, m_2]) \cdot (r_{HD}[n_1, n_2] + \delta_{HDn}), & r_{HD}[n_1, n_2] < -\delta_{HDn} \end{cases} \quad 19)$$

$$m_{rHD}[m_1, m_2] = \quad 20)$$
$$\begin{cases} 0, & |H(M_{HDn}^T x_n) - y_1[m_1, m_2]| \geq \max_{mr} \\ \dfrac{(\max_{mr} - |H(M_{HDn}^T x_n) - y_1[m_1, m_2]|)}{\max_{mr}}, & |H(M_{HDn}^T x_n) - y_1[m_1, m_2]| < \max_{mr} \end{cases}$$

In this case, when the error value of a motion estimation value is evaluated, x to be found currently cannot be a basis, and therefore $y_1$ becomes a basis. $P_{HDn}$ performs decisive functions of increasing the sharpness of edges and preventing a flickering phenomenon in a moving image.

In the present invention, wavelet conversion is used for the down-sampling and up-sampling used in H and $H^T$. The reason for this is that detailed portions of a video can be preserved well due to high-energy compaction. In forward wavelet conversion, a signal having a length of n is divided into a low frequency band signal having a length of n/2 and a high frequency band signal having a length of n/2. In contrast, in backward wavelet conversion, a low frequency band signal having a length of n/2 and a high frequency band signal having a length of n/2 are restored to an original signal having a length of n.

Therefore, the down-sampling of an image can be performed by dividing an image m×n into LL (low-pass, low-pass), LH (low-pass, high-pass), HL (high-pass, low-pass) and HH (high-pass, high-pass) images having a size of (m/2)× (n/2) using forward wavelet transform, and then taking the LL image.

When the brightness value of the LL image is divided by 2, overall brightness values before and after down-sampling become identical. In the present invention, in order to convert a 1920×1080 image into a 720×480 image, a 1920×1080 image is reduced to a 1440×960 image, which is twice a 480p image, through bicubic interpolation, and is then down-sampled to a 720×480 image through wavelet transform.

In contrast, in up-scaling, when backward wavelet transform is performed by using a 720×480 image, configured to have a double brightness value, as an LL image and three 720×480 images, filled with 0, as LH, HL and HH images, respectively, a 1440×960 image can be obtained. Thereafter, when the 1440×960 image is expanded through bicubic interpolation, a 1920×1080 image can be obtained.

Equation 21) can be expressed using the above-described projection operations as follows:

$$x^{k+1} = P_{luma} P_{smooth} \left( \frac{1}{I+J} \left( \sum_{i=1}^{I} P_{SDi} + \sum_{j=2}^{J} P_{HDj} \right) \right) x^k \quad 21)$$

$P_{luma}$ and $P_{smooth}$ require relatively small amounts of computational work and therefore the influence of $P_{luma}$ and $P_{smooth}$ on the total amount of computational work is small, whereas $P_{SDi}$ and $P_{Hdi}$ require relatively large amounts of computational work. However, by connecting projection operations having large amounts of computational work in parallel to each other as in Equation 21), the overall time taken to perform POCS can be reduced significantly.

Meanwhile, FIG. 2 illustrates the construction of an SD-to-HD scaling apparatus, including parallel wavelet-POCS video expansion, which is proposed by the present invention. For example, when an input interlaced scanning SD image is converted into a progressive scanning SD image through de-interlacing, the screen size of the image is made identical to that of an HD image through a wavelet/bicubic image interpolation unit 10.

The wave/bicubic-interpolated image is used as an initial value for a parallel wavelet-POCS image expansion unit 20. An HD-SD motion estimation unit 50 estimates a motion component based on a current SD image and an HD image immediately previously stored in HD frame memory 40. The estimated motion component is used as a correction value for parallel wavelet-POCS video expansion, thereby achieving expansion into an HD image.

Since the image, scaled several times through Equation 21), still contains degradation, such as blurring, the image is finally outputted through a deblurring unit 30. In deblurring, a blurring operation H that causes degradation is estimated, and an original signal is restored through the filter of the following Equation:

$$G_{CLS}(k, l) = \frac{H^*(k, l)}{|H(k, l)|^2 + \lambda |C(k, l)|^2} \quad 22)$$

where $\lambda$ is a constant that determines the extent to which the high frequency components of an image are included. In the present invention, the blurring operation H is assumed to be a Gaussian smoothing filter. The reason for this is that the distribution of errors occurring due to an inaccurate motion vector at the time of motion compensation within $P_{SDi}$ and $P_{HDi}$ is Gaussian. As a result, not only blurring, but also degradation due to motion compensation error, can be removed through the deblurring.

Meanwhile, for example, various software or firmware layers in a module or routine form, including application programs, operating system modules, and device drivers, can be stored in one or more storage media in an apparatus for scaling image signals, such as a TV or set-top box. The storage media include a hard disk driver, a Compact Disk (CD) or Digital Versatile Disk (DVD) driver, a floppy disk driver, nonvolatile memory, and system memory. The modules, routines or other layers, stored in the storage media, include instructions to instruct the scaling apparatus to perform programmed acts, once they are executed.

The software or firmware layers can be loaded on the system using one of several methods. For example, code segments, which are stored in a floppy disk, a CD or DVD medium, or a hard disk, or transported through a network interface card, a modem or another interface device, can be loaded on the system and executed as a corresponding software or firmware layer. In the loading or transportation process, data signals, which are loaded on a carrier (transmitted via a telephone line, a network line, a wireless link, a cable or the like) can transfer the code segments to the system.

As a result, HD video can be produced from SD video at high speed, and motion estimation error occurring at the time of expanding video into super-resolution video can be prevented, therefore degradation occurring due to motion estimation error can be reduced.

The above-described preferred embodiments of the present invention have been disclosed for illustrative purposes, and those skilled in the art can make various modifications, variations, substitutions and additions without departing from the technical spirit and scope of the present invention disclosed in the accompanying claims.

The invention claimed is:

1. A video signal processing method, comprising:
generating video having a second screen size from an input video having a first screen size through wavelet/bicubic interpolation; and
applying a parallel Projection Onto Convex Sets (POCS) method to the generated video having the second screen size, wherein the video having the second screen size, generated through the wavelet/bicubic video interpolation, is used as an initial value for the POCS method, and a motion component, estimated based on a current image of the video having the first screen size and a previous image of an expanded video having the second screen size obtained through the application of the POCS method, is used as a correction value for the POCS method, and
wherein the parallel POCS method is performed based on the following equation $$x^{k+1} = P_n P_{n-1}\left(\frac{1}{n-2}\sum_{i=1}^{n-2} P_i\right)x^k,$$

where x is video data, Pn, Pn−1, and Pi (i=1, . . . , n−2) are three types of different projection operations, and Pi (i=1, . . . , n−2) is processed in parallel.

2. The video signal processing method as set forth in claim 1, further comprising performing deblurring on the video to which the POCS method is applied.

3. The video signal processing method as set forth in claim 1, wherein the projection operators Pn and Pn−1 are related to constraints for a size and a band of output data, respectively, and the set Pi (i=1, . . . , n−2) is related to conversion between the first screen size and the second screen size.

4. The video signal processing method as set forth in claim 2, wherein the deblurring is performed using a Gaussian smoothing filter.

5. A video signal processing apparatus, comprising:
a video interpolator to generate video having a second screen size from an input video having a first screen size through wavelet/bicubic interpolation;
a video expander to expand video through application of a parallel Projection Onto Convex Sets (POCS) method using the video having the second screen size, generated through the video interpolator, as an initial value and an estimated motion component as a correction value;
a storage area to store the expanded video having the second screen size obtained through the video expander; and
a motion estimator to estimate a motion component of a video based on a current image of the video having the first screen size and a previous image of the expanded video having the second screen size stored in the storage area, and the motion estimator to provide the estimated motion component to the video expander,
wherein the parallel POCS method is performed based on the following equation $$x^{k+1} = P_n P_{n-1}\left(\frac{1}{n-2}\sum_{i=1}^{n-2} P_i\right)x^k,$$

where x is video data, Pn, Pn−1, and Pi (i=1, . . . , n−2) are three types of different projection operations, and Pi (i=1, . . . , n−2) is processed in parallel.

6. The video signal processing apparatus as set forth in claim 5, further comprising a deinterlacer for converting input interlaced scanning video into progressive scanning video.

7. The video signal processing apparatus as set forth in claim 5, further comprising a deblurrer to perform deblurring on the expanded video having the second screen size obtained through the video expander.

8. The video signal processing apparatus as set forth in claim 5, wherein the projection operators Pn and Pn−1 are related to constraints for a size and a band of output data, respectively, and the set Pi (i=1, . . . , n−2) is related to conversion between the first screen size and the second screen size.

9. The video signal processing apparatus as set forth in claim 7, wherein the deblurrer performs the deblurring using a Gaussian smoothing filter.

10. A non-transitory machine-readable storage medium containing instructions, when executed in a video signal processing apparatus, causing the apparatus to:
generate video having a second screen size from an input video having a first screen size through wavelet/bicubic interpolation; and
apply a parallel Projection Onto Convex Sets (POCS) method to the generated video having a second screen size, wherein the video having the second screen size, generated through the wavelet/bicubic video interpolation, is used as an initial value for the POCS method, and a motion component, estimated based on a current image of the video having the first screen size and a previous image of an expanded video having the second screen size obtained through the application of the POCS method, is used as a correction value for the POCS method,
wherein the parallel POCS method is performed based on the following equation $$x^{k+1} = P_n P_{n-1}\left(\frac{1}{n-2}\sum_{i=1}^{n-2} P_i\right)x^k,$$

where x is video data, Pn, Pn−1, and Pi (i=1, . . . , n−2) are three types of different projection operations, and Pi (i=1, . . . , n−2) is processed in parallel.

* * * * *